No. 719,058. PATENTED JAN. 27, 1903.
J. H. SYLVESTERSEN.
DITCHING MACHINE.
APPLICATION FILED APR. 17, 1902.
NO MODEL. 2 SHEETS—SHEET 2.
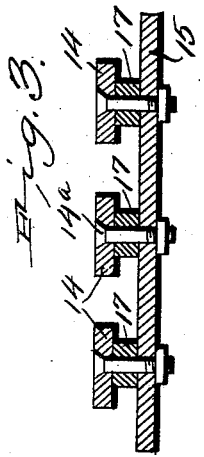
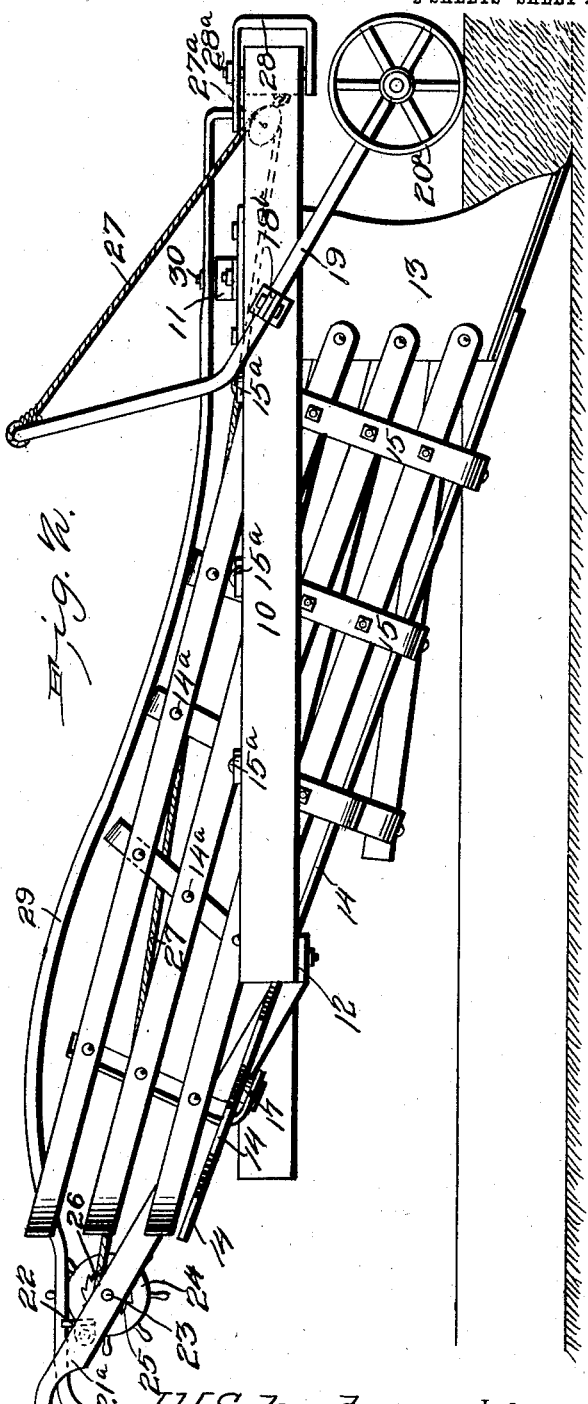

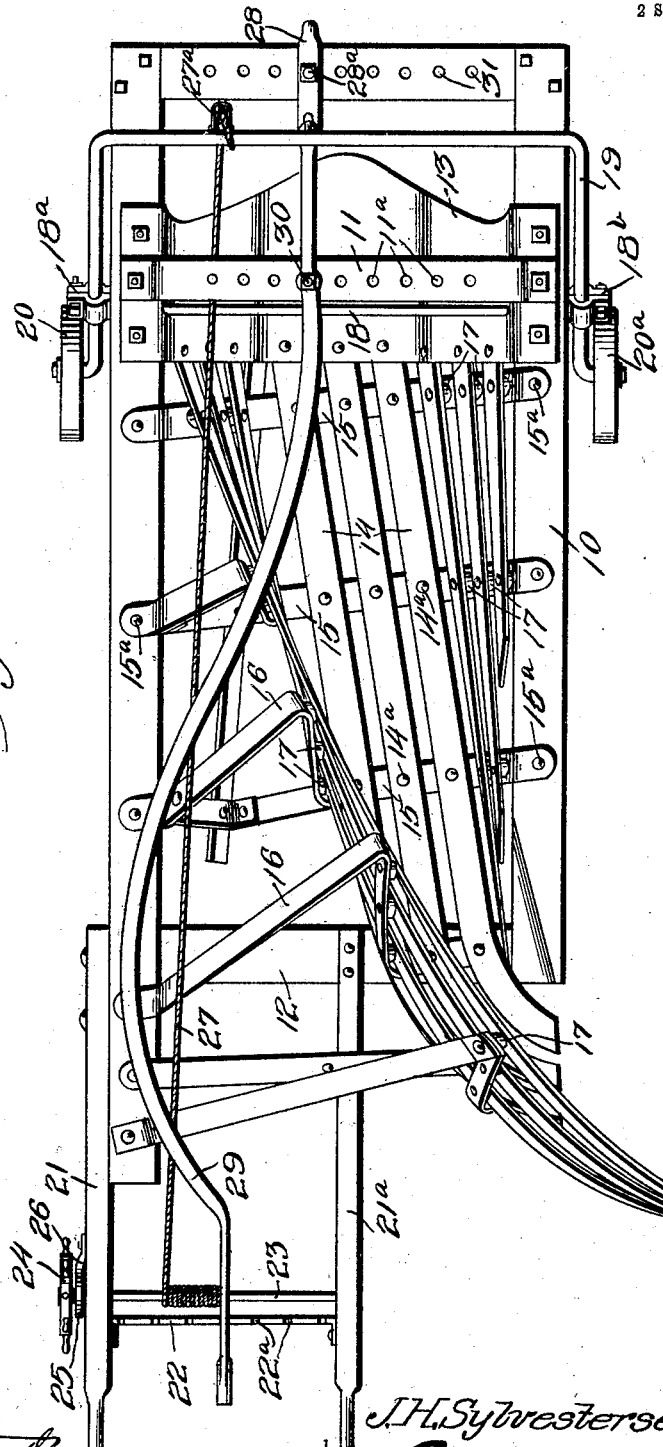

UNITED STATES PATENT OFFICE.

JORGEN H. SYLVESTERSEN, OF DUNDEE, ILLINOIS.

DITCHING-MACHINE.

SPECIFICATION forming part of Letters Patent No. 719,058, dated January 27, 1903.

Application filed April 17, 1902. Serial No. 103,388. (No model.)

*To all whom it may concern:*

Be it known that I, JORGEN H. SYLVESTERSEN, a citizen of the United States, residing at Dundee, in the county of Kane and State of Illinois, have invented a new and useful Ditching-Machine, of which the following is a specification.

This invention relates to machines for forming ditches in land, more particularly where the ground is wet and adhesive; and the invention consists in certain novel features of the construction, as hereinafter shown and described, and specifically pointed out in the claims.

In the drawings illustrative of the invention, Figure 1 is a plan view, and Fig. 2 is a side elevation. Fig. 3 is an enlarged sectional detail illustrating the moldboard construction.

The framework is shown at 10, being oblong in shape and preferably formed of wooden beams, with suitable transverse braces 11 12, preferably of metal, and with the "share" or cutting member 13 depending from the forward end of the frame, as shown. Leading backward from the share 13 is the "moldboard," consisting of spaced metal bars 14, suitably bent and curved so that when properly supported and connected by the transverse holding-bars 15 the earth disengaged by the share 13 will be carried backwardly and off to one side and deposited at the side of the ditch in the usual manner.

The forward transverse bars 15 will be supported from the frame 10, as shown at $15^a$, while the rearward bars, which support the rising and laterally-curving bars 14, will be supported by braces 16, the whole forming an open "slat-like" framework, as shown.

Between the longitudinal bars 14 and the transverse holding-bars 15 are interposed ferrules or separating-thimbles 17, (shown more clearly in Fig. 3,) so that the earth in passing over the moldboard engages the longitudinal bars only and will not come in contact with the transverse bars, so that the resistance is reduced to the minimum, which is a very important consideration when working in wet or adhesive soils. The bars 14 will be set close enough together to properly sustain the soil passing over them, while at the same time as far apart as consistent with the work required of them to reduce the friction to a minimum. The distance between the bars will be sufficient to support the earth and prevent it from coming in contact with the transverse bars 15 and be retarded thereby. This is a very important feature of the invention and adds materially to the efficiency of the device.

The inner ends of the rivets or bolts $14^a$, by which the bars 14 and 15 and the spacers 17 are held, will be countersunk in the bars 14, as shown in Fig. 3, so as to offer no obstruction to the passage of the earth.

Transversely disposed upon the forward end of the framework 10 is a shaft 18, having coupling means $18^a$ $18^b$ on its ends outside the frame, whereby a yoke-frame 19, carrying the guide-wheels 20 $20^a$, will be supported, as shown.

At the rear of the machine are two handles 21 $21^a$, supported from the frame 10 and cross-brace 12 and connected by a brace-bar 22, the latter having teeth or notches $22^a$, and a drum-shaft 23, as shown.

The shaft 23 is provided with an operating-wheel 24 and a ratchet 25, the latter engaged by a pawl 26 on the handle 21, so that the shaft will be held from running backward.

A cable 27 is attached by one end to the shaft 23 and carried forward through a pulley $27^a$ and thence to the yoke-frame 19, as shown. By this means it will be readily understood that by revolving the shaft 23 the bearing-wheels 20 $20^a$ may be elevated and depressed to regulate the depth of the cut of the machine and also to elevate the forward end and support the share 13 entirely clear of the ground when transporting the machine.

Attached to the forward member of the frame 10 is a clevis 28 of any approved form, to which the draft cable or chain is attached. The clevis is pivoted centrally to the frame 10, as at $28^a$, and extends rearwardly of the forward beam and is connected to the forward end of the lever 29, the latter pivoted at 30 to the transverse bar 11 and engaging the notches $22^a$ in the brace 22, as shown. By this means it will be readily understood that by adjusting the lever 29 upon the bar 22 the clevis will be moved upon its pivot $28^a$, and thereby adjust the "draft" laterally and guide the machine to the right or left to a limited extent. The bar 11 is provided with a series of perforations 11ª for the pivot-bolt 30, and the front member of the frame 10 is likewise provided with a series of perforations 31, so that the draft may be adjusted laterally to any desired extent. By this means the course of the machine may be controlled and the side draft regulated to any desired extent.

In some forms of the machine the moldboard may be carried directly backward and the earth delivered upon supplemental delivery mechanism or the moldboard arranged to deliver the earth upon both sides; but these modifications would not affect the spirit of the invention or sacrifice any of its advantages.

Having thus fully described my invention, what I claim is—

1. In a device of the character described, a moldboard formed of spaced bars, transverse supports in the rear of said bars and spacing-sleeves between said bars and supports, whereby the earth passing over said moldboard is prevented from engaging said supports, substantially as described.

2. In a device of the character described, a moldboard formed of spaced bars, transverse supports in the rear of said bars, means for connecting said bars and supports, and spacing-sleeves upon said connecting means between said bars and supports, substantially as described.

3. In a device of the character described, a supporting-framework, a share conforming to the ditch to be cut and suspended from said framework, a moldboard composed of spaced bars leading from said share transverse supporting-strips beneath said bars and spacing-sleeves between said bars and strips, whereby the earth passing over said moldboard is prevented from engaging said strips, substantially as described.

4. In a ditching-machine, a main frame having handle-levers at one side, at its rear end, a share depending from and secured to the frame, near the front end thereof, a moldboard extending upwardly and rearwardly from the share and having its rear portion rearwardly deflected obliquely with reference to the line of draft and extended beyond the side of the frame opposite that to which the handle-levers are affixed, a yoke-frame astride the front portion of the main frame, pivotally connected thereto, bearing-wheels carried by the yoke-frame and disposed to run on the surface on opposite sides of the ditch, and means to adjust and secure said yoke-frame, to raise and lower the main frame and share, substantially as described.

In testimony that I claim the foregoing as my own I have hereto affixed my signature in the presence of two witnesses.

JORGEN H. SYLVESTERSEN.

Witnesses:
LYMAN ANDREWS,
GEO. GOEBEL.